(12) United States Patent
Pai et al.

(10) Patent No.: US 12,308,997 B2
(45) Date of Patent: *May 20, 2025

(54) ASYNCHRONOUS OBJECT MANAGER IN A NETWORK ROUTING ENVIRONMENT

(71) Applicant: Arrcus Inc., San Jose, CA (US)

(72) Inventors: Nalinaksh Pai, San Ramon, CA (US); Kalyani Rajaraman, San Jose, CA (US); Vikram Ragukumar, Pleasanton, CA (US)

(73) Assignee: Arrcus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,173

(22) Filed: Nov. 21, 2023

(65) Prior Publication Data

US 2024/0086263 A1     Mar. 14, 2024

Related U.S. Application Data

(63) Continuation of application No. 17/539,893, filed on Dec. 1, 2021, now Pat. No. 11,861,419, which is a
(Continued)

(51) Int. Cl.
*G06F 9/54* (2006.01)
*G06F 9/455* (2018.01)
(Continued)

(52) U.S. Cl.
CPC .......... *H04L 12/44* (2013.01); *G06F 9/45558* (2013.01); *G06F 9/4881* (2013.01);
(Continued)

(58) Field of Classification Search
CPC ..... H04L 45/2224; H04L 45/26; H04L 45/28; H04L 45/01; H04L 45/50; H04L 45/308;
(Continued)

(56) References Cited

U.S. PATENT DOCUMENTS 6,879,594 B1    4/2005   Lee
8,537,840 B1    9/2013   Raszuk
(Continued)

FOREIGN PATENT DOCUMENTS

CA    2279845 A1     5/1998
CN    101848236 A    9/2010
(Continued)

OTHER PUBLICATIONS

Cisco Documentation: "Internet Engineering Task Force (IETF) Network Working Group draft-ietf-idr-bgp4-24.txt document.", Apr. 28, 2011 (Apr. 28, 2011), pp. 1-166, XP093187495, Retrieved from the Internet: URL:https://www.cisco.com/c/en/us/td/docs/routers/xrl2000/software/xrl2k_r4-1 /routing/configuration/guide/routing_cg41 xrl 2k_chapterl .pdf.
(Continued)

*Primary Examiner* — Charles M Swift
(74) *Attorney, Agent, or Firm* — David R. Stevens; Stevens Law Group

(57) ABSTRACT

Systems, methods, and devices for offloading network data to a datastore. A system includes routing chip hardware and an asynchronous object manager in communication with the routing chip hardware. The asynchronous object manager is configurable to execute instructions stored in non-transitory computer readable storage media. The instructions include asynchronously receiving a plurality of objects from one or more producers. The instructions include identifying one or more dependencies between two or more of the plurality of objects. The instructions include reordering the plurality of objects according to the one or more dependencies. The instructions include determining whether the one or more dependencies is resolve. The instructions include, in response to determining the one or more dependencies is
(Continued)

resolved, calling back an application and providing one or more of the plurality of objects to the application.

20 Claims, 10 Drawing Sheets

Related U.S. Application Data continuation of application No. 16/549,215, filed on Aug. 23, 2019, now Pat. No. 11,221,893.

(60) Provisional application No. 62/722,003, filed on Aug. 23, 2018.

(51) Int. Cl.

| | | |
|---|---|---|
| *G06F 9/48* | (2006.01) | |
| *G06F 16/22* | (2019.01) | |
| *G06F 16/23* | (2019.01) | |
| *G06F 16/27* | (2019.01) | |
| *H04L 9/40* | (2022.01) | |
| *H04L 12/28* | (2006.01) | |
| *H04L 12/44* | (2006.01) | |
| *H04L 12/46* | (2006.01) | |
| *H04L 12/66* | (2006.01) | |
| *H04L 12/707* | (2013.01) | |
| *H04L 45/00* | (2022.01) | |
| *H04L 45/02* | (2022.01) | |
| *H04L 45/24* | (2022.01) | |
| *H04L 45/28* | (2022.01) | |
| *H04L 45/48* | (2022.01) | |
| *H04L 45/50* | (2022.01) | |
| *H04L 45/586* | (2022.01) | |
| *H04L 45/745* | (2022.01) | |
| *H04L 47/125* | (2022.01) | |
| *H04L 67/1097* | (2022.01) | |
| *H04L 67/55* | (2022.01) | |
| *H04L 49/25* | (2022.01) | |

(52) U.S. Cl.
CPC ............... *G06F 9/54* (2013.01); *G06F 9/542* (2013.01); *G06F 16/2272* (2019.01); *G06F 16/2379* (2019.01); *G06F 16/27* (2019.01); *G06F 16/278* (2019.01); *H04L 12/2881* (2013.01); *H04L 12/462* (2013.01); *H04L 12/4633* (2013.01); *H04L 12/4641* (2013.01); *H04L 12/66* (2013.01); *H04L 45/02* (2013.01); *H04L 45/08* (2013.01); *H04L 45/22* (2013.01); *H04L 45/24* (2013.01); *H04L 45/26* (2013.01); *H04L 45/28* (2013.01); *H04L 45/48* (2013.01); *H04L 45/50* (2013.01); *H04L 45/586* (2013.01); *H04L 45/66* (2013.01); *H04L 45/745* (2013.01); *H04L 47/125* (2013.01); *H04L 63/0272* (2013.01); *H04L 67/1097* (2013.01); *H04L 67/55* (2022.05); *G06F 2009/45595* (2013.01); *H04L 2012/4629* (2013.01); *H04L 49/25* (2013.01)

(58) Field of Classification Search
CPC ............... H04L 45/586; H04L 12/2881; H04L 12/4641; H04L 12/66; H04L 12/4633; G06F 16/278; G06F 16/2379; G06F 16/2272; G06F 9/48; G06F 9/4881; G06F 9/455; G06F 9/45558
See application file for complete search history.

(56) References Cited

U.S. PATENT DOCUMENTS

| | | |
|---|---|---|
| 9,330,154 B2 | 5/2016 | Di Vincenzo |
| 9,507,856 B1 | 11/2016 | Camplejohn |
| 9,652,483 B1 | 5/2017 | Cao et al. |
| 10,785,296 B1 | 9/2020 | Allison |
| 10,931,530 B1 | 2/2021 | Rzehak |
| 2003/0012193 A1 | 1/2003 | Novaes |
| 2007/0091796 A1 | 4/2007 | Filsfils |
| 2007/0214280 A1 | 9/2007 | Patel |
| 2009/0257439 A1 | 10/2009 | Xu |
| 2009/0296579 A1 | 12/2009 | Dharwadkar |
| 2010/0046531 A1 | 2/2010 | Louati |
| 2010/0125574 A1 | 5/2010 | Navas |
| 2010/0189115 A1 | 7/2010 | Kitada |
| 2011/0320550 A1 | 12/2011 | Lawson |
| 2013/0054763 A1 | 2/2013 | Van der Merwe |
| 2013/0286846 A1 | 10/2013 | Atlas et al. |
| 2013/0301522 A1 | 11/2013 | Krishna |
| 2014/0258485 A1 | 9/2014 | Yang |
| 2014/0372748 A1 | 12/2014 | Dixon |
| 2015/0188808 A1 | 7/2015 | Ghanwani |
| 2015/0195136 A1 | 7/2015 | Mermoud |
| 2015/0195368 A1 | 7/2015 | Bandyopadhyay |
| 2015/0263899 A1 | 9/2015 | Tubaltsev |
| 2015/0304206 A1 | 10/2015 | Filsfils et al. |
| 2016/0028613 A1 | 1/2016 | Haramaty |
| 2016/0065498 A1 | 3/2016 | Harper |
| 2016/0134116 A1 | 5/2016 | Carlson |
| 2016/0142313 A1 | 5/2016 | Devireddy et al. |
| 2016/0218917 A1 | 7/2016 | Zhang |
| 2016/0234326 A1 | 8/2016 | Camplejohn |
| 2016/0248658 A1 | 8/2016 | Patel et al. |
| 2016/0248663 A1 | 8/2016 | Patel |
| 2016/0277210 A1 | 9/2016 | Lin et al. |
| 2016/0321341 A1 | 11/2016 | Ramamurthi |
| 2016/0337464 A1 | 11/2016 | Eriksson |
| 2017/0126486 A1 | 5/2017 | Prieto |
| 2017/0244657 A1 | 8/2017 | Baldwin |
| 2018/0167475 A1 | 6/2018 | Agarwal et al. |
| 2018/0183706 A1 | 6/2018 | Przygienda et al. |
| 2018/0205634 A1 | 7/2018 | Avci et al. |
| 2019/0028465 A1 | 1/2019 | Allen |
| 2019/0079948 A1 | 3/2019 | Ye |
| 2019/0149896 A1 | 5/2019 | Gramm |
| 2019/0297000 A1 | 9/2019 | Dutta |
| 2019/0373073 A1 | 12/2019 | John |
| 2021/0149752 A1 | 5/2021 | Burroughes |

FOREIGN PATENT DOCUMENTS

| | | |
|---|---|---|
| CN | 101960426 A | 1/2011 |
| CN | 103984694 A | 8/2014 |
| CN | 104486124 | 4/2015 |
| CN | 105556502 A | 4/2016 |
| CN | 105991432 | 10/2016 |
| CN | 106878065 | 6/2017 |
| CN | 107547402 | 1/2018 |
| CN | 108075969 A | 5/2018 |
| EP | 3070877 | 9/2016 |
| JP | 2003204332 | 7/2003 |
| JP | 2016536690 | 11/2016 |

OTHER PUBLICATIONS

Husseman. "A Beginner's Guide to Understanding the Leaf-Spine Network Topology." In: West Monroe Partners. Mar. 23, 2015 (Mar. 23, 2015) Retrieved on Oct. 13, 2019 (Oct. 13, 2019) from <https://blog.westmonroepartners.com/a-beginners-guide-to-understanding-the-leaf-spine-network-topology/> entire document.

VXLAN Tutorial, Ohira Shinichi, Cisco Systems G.K., Jan. 20, 2016, p. 1 to 49 https://www.janog.gr.jp/meeting/janog37/download_file/vxlan.pdf.

(56) References Cited

OTHER PUBLICATIONS

Internet Engineering Task Force (IETF) Request for Comments: 7432 Category: Standards Track ISSN: 2070-1721, BGP MPLS-Based Ethernet VPN, A. Sajassi, Ed., Feb. 2015.

ASYNCHRONOUS OBJECT MANAGER IN A NETWORK ROUTING ENVIRONMENT

CROSS-REFERENCE TO RELATED APPLICATIONS

This application is a continuation of U.S. patent application Ser. No. 17/539,893, filed Dec. 1, 2021, titled "Asynchronous Object Manager In A Network Routing Environment," which is a continuation of U.S. patent application Ser. No. 16/549,215 filed Aug. 23, 2019 titled "Asynchronous Object Manager In A Network Routing Environment," which claims priority to U.S. Provisional Patent Application Ser. No. 62/722,003 filed Aug. 23, 2018 titled "Database Systems Methods And Devices," all of which are incorporated herein by reference in their entirety, including but not limited to those portions that specifically appear hereinafter, the incorporation by reference being made with the following exception: In the event that any portion of the above-referenced applications is inconsistent with this application, this application supersedes the above-referenced applications.

TECHNICAL FIELD

The disclosure relates to computing networks and particularly relates to resolving information recovery conflicts in a network environment.

BACKGROUND

Network computing is a means for multiple computers or nodes to work together and communicate with one another over a network. There exist wide area networks (WAN) and local area networks (LAN). Both wide and local area networks allow for interconnectivity between computers. Local area networks are commonly used for smaller, more localized networks that may be used in a home, business, school, and so forth. Wide area networks cover larger areas such as cities and can even allow computers in different nations to connect. Local area networks are typically faster and more secure than wide area networks, but wide area networks enable widespread connectivity. Local area networks are typically owned, controlled, and managed in-house by the organization where they are deployed, while wide area networks typically require two or more constituent local area networks to be connection over the public Internet or by way of a private connection established by a telecommunications provider.

Local and wide area networks enable computers to be connected to one another and transfer data and other information. For both local and wide area networks, there must be a means to determine a path by which data is passed from one compute instance to another compute instance. This is referred to as routing. Routing is the process of selecting a path for traffic in a network or between or across multiple networks. The routing process usually directs forwarding on the basis of routing tables which maintain a record of the routes to various network destinations. Routing tables may be specified by an administrator, learned by observing network traffic, or built with the assistance of routing protocols.

Some network routing operations include transmitting information objects that are generated by multiple different producers. These objects may need to be transmitted in a certain order so that a receiving application can properly process the objects. However, when there are multiple different producers, it can be challenging to transmit the objects in the correct order. Specifically, in a distributed network operating system (NOS), forwarding information objects are produced by different producers. The forwarding objects tend to be dependent on one another and the programming flow should consider these dependencies. The objects should be harmonized and programmed in an orderly fashion into the underlying data plane. One traditional approach has been to have different producers synchronize with one another and then push the objects down in the correct sequence across the multiple producers. There are numerous deficiencies with this approach. This approach leads to tight state synchronization across processes and tends to create a tightly coupled distributed NOS. The tight synchronization can create numerous issues when the NOS is distributed across different machines or when components of the NOS operates in a cloud-based network environment.

In light of the foregoing, disclosed herein are systems, methods, and devices for improved network computing operations and for an asynchronous object manager to receive and reorder information objects in a network environment.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1:
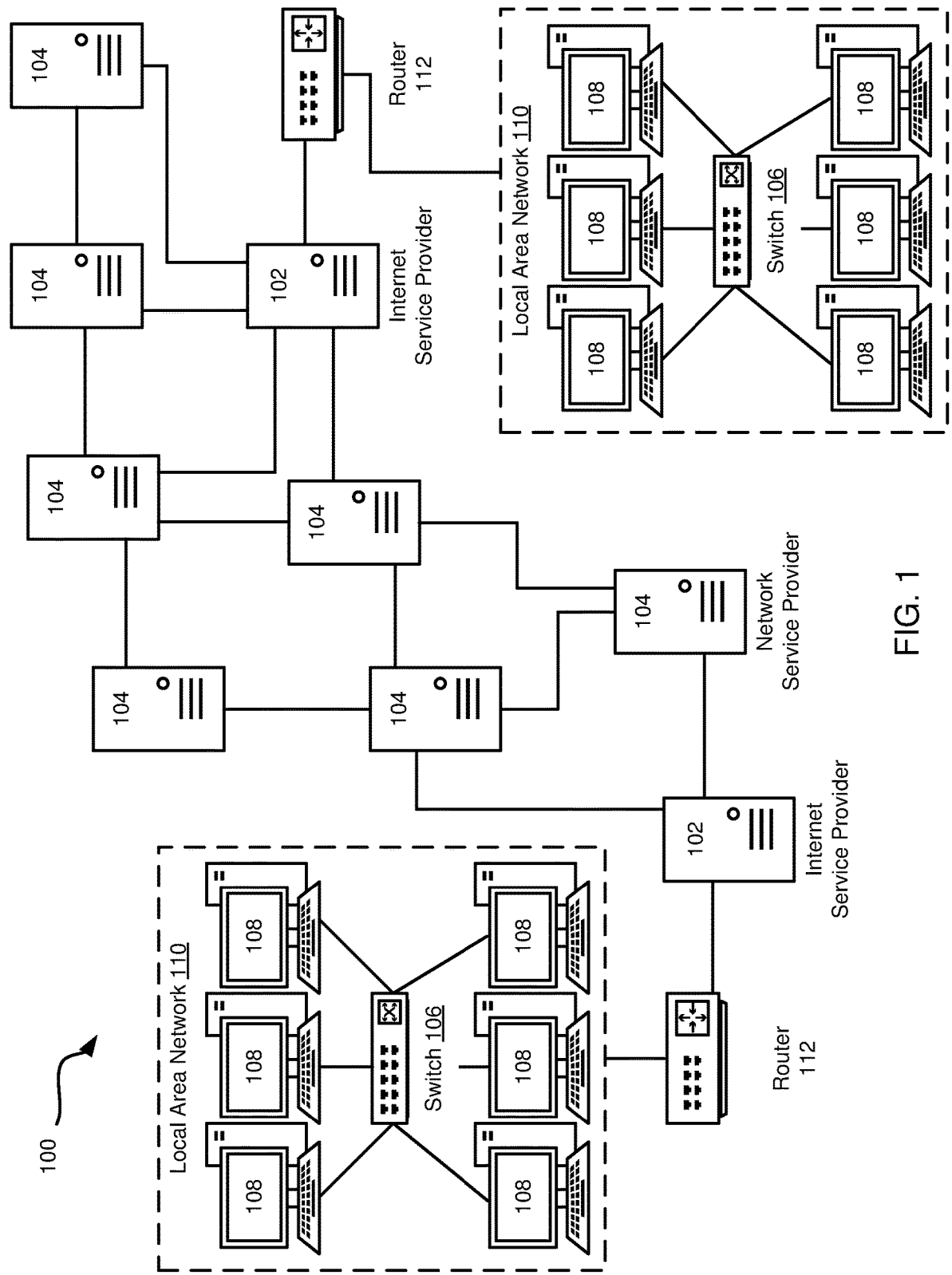
FIG. 1 is a schematic diagram of a system of networked devices communicating over the Internet.

Disclosed herein are systems, methods, and devices for improved information routing in a network computing environment. An embodiment of the disclosure is an asynchronous object manager configured to track the life cycle of different control plan information. The asynchronous object manager can be deployed in a network routing environment and may be included in a software stack for controlling operations of a networking device such as a switch or router.

In a computer network environment, a networking device such as a switch or router may be used to transmit information from one destination to a final destination. In an embodiment, a data package and a message may be generated at a first location such as computer within a person's home. The data package and the message could be generated from the person interacting with a web browser and requesting information from or providing information to a remote server accessible over the Internet. In an example, the data package and the message could be information the person input into a form accessible on a webpage connected to the Internet. The data package and the message may need to be transmitted to the remote server that may be geographically located very far from the person's computer. It is very likely that there is no direct communication between the router at the person's home and the remote server. Therefore, the data package and the message must travel by "hopping" to different networking devices until reaching the final destination at the remote server. The router at the person's home must determine a route for transmitting the data package and the message thru multiple different devices connected to the Internet until the data package and the message reach the final destination at the remote server.

The processes of determining a best bath from a first location to a final destination and forwarding data packages and messages to a next destination are significant functions performed by a networking device such as a switch or router. Disclosed herein are systems, methods, and devices for improving the operations of a networking device. An embodiment of the disclosure is encompassed in a software stack that operates on the routing chip hardware of a switch or router. One portion of the software stack is the asynchronous object manager as discussed herein. The asynchronous object manager enables numerous benefits in the network routing environment. First, because of the operations performed by the asynchronous object manager, producers of messages no longer need to speak with one another and can instead transmit messages to be organized by the asynchronous object manager. Further, the asynchronous object manager provides a means to express relationships and dependencies between different objects. Further, a state machine within the asynchronous object manager allows the asynchronous object manager to wait for all required objects to arrive before issuing an order to a different portion of the software stack.

In an embodiment, the asynchronous object manager is software that sits on top of and manages routing chip hardware in a networking device such as a router or switch. Notably, the asynchronous object manager may be used in a router or switch without modification to the software language. In an embodiment, the asynchronous object manager in combination with other software stacks can be used to convert a switch to a router and vice versa.

The asynchronous object manager collects information from a computer network and digests the information in a form that can be programmed by routing chip hardware. The asynchronous object manager causes the package forwarding function to be performed by the routing chip hardware. The asynchronous object manager is the lowest layer of the software stack that operates on the networking device. The asynchronous object manager is responsible for interacting with the underlying routing chip hardware and for interacting with application program interfaces (APIs).

The asynchronous object manager may work in conjunction with a data plan adaptation layer (DPAL). The DPAL may have multiple clients and may need to wait for different pieces of information from different clients. The DPAL cannot perform its functions unless the objects are arranged in a specific order. In an embodiment, the primary task of the asynchronous object manager is to reorder objects so the objects can be processed by the DPAL. The asynchronous object manager can be used outside the context of DPAL and may be applied as VPN software for building layered segments on top of a layer3 network, and others.

In an embodiment, the asynchronous object manager is a state machine. The asynchronous object manager is designed to build in certain states within the conditions of predefined parameters. The asynchronous object manager may be configured to rearrange messages that carry programming information rather than managing information packages. In an example, the asynchronous object manager is configured to tell the underlying routing chip hardware that, for example, interphase A needs to be transferred to interphase B, and so forth.

In an embodiment, the asynchronous object manager interacts with the DPAL and provide DPAL with a route for transferring messages from a first location to a final destination. In an example, the DPAL may receive messages over multiple communication channels. The DPAL can query the asynchronous object manager and request a route for transmitting a message. The asynchronous object manager creates the route, records the route, and provides the route to the DPAL. The asynchronous object manager is unique in that it expresses relationship between different objects. The state machine built inside the asynchronous object manager allows the asynchronous object manager to wait for all objects to arrive before issues a route to the DPAL or allowing changes to be made to any objects. The asynchronous object manager eliminates the need for object producers to communicate with one another.

For purposes of furthering understanding of the disclosure, some explanation will be provided for numerous networking computing devices and protocols.

A BGP instance is a device for routing information in a network. A BGP instance may take the form of a route reflector appliance. The BGP instance may run on a switch, router, or BGP speakers on a switch. At a high level, the BGP instance sends all the paths it has learnt for a prefix to the best path controller. The best path controller responds with a set of best path from amongst those paths. The best path controller is permitted to modify the next-hop and attributes for any of the paths. Once the best paths are received, the BGP instance updates the local Routing Information Base (RIB) and advertises the best path out to its neighbors.

A switch (may alternatively be referred to as a switching hub, bridging hub, or MAC bridge) creates a network. Most internal networks use switches to connect computers, printers, phones, camera, lights, and servers in a building or campus. A switch serves as a controller that enables networked devices to talk to each other efficiently. Switches connect devices on a computer network by using packet switching to receive, process, and forward data to the destination device. A network switch is a multiport network bridge that uses hardware addresses to process and forward data at a data link layer (layer 2) of the Open Systems Interconnection (OSI) model. Some switches can also process data at the network layer (layer 3) by additionally incorporating routing functionality. Such switches are commonly known as layer-3 switches or multilayer switches.

A router connects networks. Switches and routers perform similar functions, but each has its own distinct function to perform on a network. A router is a networking device that forwards data packets between computer networks. Routers perform the traffic directing functions on the Internet. Data sent through the Internet, such as a web page, email, or other form of information, is sent in the form of a data packet. A packet is typically forwarded from one router to another router through the networks that constitute an internetwork (e.g., the Internet) until the packet reaches its destination node. Routers are connected to two or more data lines from different networks. When a data packet comes in on one of the lines, the router reads the network address information in the packet to determine the ultimate destination. Then, using information in the router's routing table or routing policy, the router directs the packet to the next network on its journey. A BGP speaker is a router enabled with the Border Gateway Protocol (BGP).

A routing table or routing information base (RIB) is a data table stored in a router or a networked computer that lists the routes to particular network destinations. In some cases, a routing table includes metrics for the routes such as distance, weight, and so forth. The routing table includes information about the topology of the network immediately around the router on which it is stored. The construction of routing tables is the primary goal of routing protocols. Static routes are entries made in a routing table by non-automatic means and which are fixed rather than being the result of some network topology discovery procedure. A routing table may include at least three information fields, including a field for network ID, metric, and next hop. The network ID is the destination subnet. The metric is the routing metric of the path through which the packet is to be sent. The route will go in the direction of the gateway with the lowest metric. The next hop is the address of the next station to which the packet is to be sent on the way to its final destination. The routing table may further include quality of service associate with the route, links to filtering criteria lists associated with the route, interface for an Ethernet card, and so forth.

For purposes of illustrating the concept of a routing table, the routing table may be analogized to using a map for delivering a package. A routing table is similar to the use of a map for delivering a package to its final destination. When a node needs to send data to another node on a network, the node must first know where to send the data. If the node cannot directly connect to the destination node, the node must send the data to other nodes along a proper route to the destination node. Most nodes do not try to figure out which routes might work. Instead, a node will send an IP packet to a gateway in the LAN, which then decides how to route the data to the correct destination. Each gateway will need to keep track of which way to deliver various packages of data, and for this it uses a routing table. A routing table is a database that keeps track of paths, like a map, and uses these paths to determine which way to forward traffic. Gateways can also share the contents of their routing table with other nodes requesting the information.

For hop-by-hop routing, each routing table lists, for all reachable destinations, the address of the next device along the path to that destination, i.e. the next hop. Assuming the routing tables are consistent, the algorithm of relaying packets to their destination's next hop thus suffices to deliver data anywhere in a network. Hop-by-hop is a characteristic of an IP Internetwork Layer and the Open Systems Interconnection (OSI) model.

The Open Systems Interconnection (OSI) model is a conceptual model that characterizes and standardizes the communication functions of a computing system without regard to its underlying internal structure and technology. The goal of the OSI model is the interoperability of diverse communication systems with standard communication protocols. The OSI model partitions a communication system into abstraction layers. A layer serves the layer above it and is served by the layer below. For example, a layer that provides error-free communications across a network provides the path needed by applications above it, while it calls the next lower layer to send and receive packets that constitute the contents of that path. Two instances at the same layer are visualized as connected by a horizontal connection in that layer. Communication protocols enable an entity in one host to interact with a corresponding entity at the same layer in another host. Service definitions, like the OSI model, abstractly describe the functionality provided to an (N)-layer by an (N−1)-layer, wherein N is one of the layers of protocols operating in the local host.

Route control is a type of network management that aims to improve Internet connectivity and reduce bandwidth cost and overall internetwork operations. Some route control services include a suite of hardware-based and software-based products and services that work together to improve overall Internet performance and finetune the use of available Internet bandwidth at minimal cost. Route control can be successful in scenarios where a network or autonomous system is sourcing Internet bandwidth from multiple providers. Route control can aid in the selection of the most optimal path for data transmission.

Some network communication systems are large, enterprise-level networks with thousands of processing nodes. The thousands of processing nodes share bandwidth from multiple Internet Service Providers (ISPs) and can process significant Internet traffic. Such systems can be extremely complex and must be properly configured to result in acceptable Internet performance. If the systems are not properly configured for optimal data transmission, the speed of Internet access can decrease, and the system can experience high bandwidth consumption and traffic. To counteract this problem, a set of services may be implemented to remove or reduce these concerns. This set of services may be referred to as routing control.

An embodiment of a routing control mechanism is composed of hardware and software. The routing control mechanism monitors all outgoing traffic through its connection with an Internet Service Provider (ISP). The routing control mechanism aids in selecting the best path for efficient transmission of data. The routing control mechanism may calculate the performance and efficiency of all ISPs and select only those ISPs that have performed optimally in applicable areas. Route control devices can be configured according to defined parameters pertaining to cost, performance, and bandwidth.

A known algorithm for determining the best path for the transmission of data is referred to as the Border Gateway Protocol (BGP). BGP is a path-vector protocol that provides routing information for autonomous systems on the Internet. When BGP is configured incorrectly, it can cause sever availability and security issues. Further, modified BGP route information can permit attackers to redirect large blocks of traffic so the traffic travels to certain routers before reaching its intended destination. The BGP best path algorithm can be implemented to determine the best path to install in an Internet Protocol (IP) routing table for traffic forwarding. BGP routers may be configured to receive multiple paths to the same destination.

The BGP best path algorithm assigns a first valid path as the current best path. The BGP best path algorithm compares the best path with the next path in the list until the BGP reaches the end of the list of valid paths. The list provides the rules that are used to determine the best path. For example, the list may include an indication that the path with the highest weight is preferred, the path without a local preference is preferred, the path that was locally originated by way of a network or aggregate BGP is preferred, a shortest path is preferred, a path with the lowest multi-exit discriminator is preferred, and so forth. The BGP best path selection process can be customized.

In the context of BGP routing, each routing domain is known as an autonomous system (AS). BGP assists in selecting a path through the Internet to connect two routing domains. BGP typically selects a route that traverses the least number of autonomous systems, referred to as the shortest AS path. In an embodiment, once BGP is enabled, a router will pull a list of Internet routes from BGP neighbors which may be ISPs. BGP will then scrutinize the list to find routes with the shortest AS paths. These routes may be entered in the router's routing table. Generally, a router will choose the shortest path to an AS. BGP uses path attributes to determine how to route traffic to specific networks.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems and methods for tracking the life cycle of objects in a network computing environment are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Referring now to the figures, FIG. 1 illustrates a schematic diagram of a system 100 for connecting devices to the Internet. The system 100 includes multiple local area networks 160 connected by a switch 106. Each of the multiple local area networks 160 can be connected to each other over the public Internet by way of a router 162. In the example system 100 illustrated in FIG. 1, there are two local area networks 160. However, it should be appreciated that there may be many local area networks 160 connected to one another over the public Internet. Each local area network 160 includes multiple computing devices 108 connected to each other by way of a switch 106. The multiple computing devices 108 may include, for example, desktop computers, laptops, printers, servers, and so forth. The local area network 160 can communicate with other networks over the public Internet by way of a router 162. The router 162 connects multiple networks to each other. The router 162 is connected to an internet service provider 102. The internet service provider 102 is connected to one or more network service providers 104. The network service providers 104 are in communication with other local network service providers 104 as shown in FIG. 1.

The switch 106 connects devices in the local area network 160 by using packet switching to receive, process, and forward data to a destination device. The switch 106 can be configured to, for example, receive data from a computer that is destined for a printer. The switch 106 can receive the data, process the data, and send the data to the printer. The switch 106 may be a layer-1 switch, a layer-2 switch, a layer-3 switch, a layer-4 switch, a layer-7 switch, and so forth. A layer-1 network device transfers data but does not manage any of the traffic coming through it. An example of a layer-1 network device is an Ethernet hub. A layer-2 network device is a multiport device that uses hardware addresses to process and forward data at the data link layer (layer 2). A layer-3 switch can perform some or all of the functions normally performed by a router. However, some network switches are limited to supporting a single type of physical network, typically Ethernet, whereas a router may support different kinds of physical networks on different ports.

The router 162 is a networking device that forwards data packets between computer networks. In the example system 100 shown in FIG. 1, the routers 162 are forwarding data packets between local area networks 160. However, the router 162 is not necessarily applied to forwarding data packets between local area networks 160 and may be used for forwarding data packets between wide area networks and so forth. The router 162 performs traffic direction functions on the Internet. The router 162 may have interfaces for different types of physical layer connections, such as copper cables, fiber optic, or wireless transmission. The router 162 can support different network layer transmission standards. Each network interface is used to enable data packets to be forwarded from one transmission system to another. Routers 162 may also be used to connect two or more logical groups of computer devices known as subnets, each with a different network prefix. The router 162 can provide connectivity within an enterprise, between enterprises and the Internet, or between internet service providers' networks as shown in FIG. 1. Some routers 162 are configured to interconnecting various internet service providers or may be used in large enterprise networks. Smaller routers 162 typically provide connectivity for home and office networks to the Internet. The router 162 shown in FIG. 1 may represent any suitable router for network transmissions such as an edge router, subscriber edge router, inter-provider border router, core router, internet backbone, port forwarding, voice/data/fax/ video processing routers, and so forth.

The internet service provider (ISP) 102 is an organization that provides services for accessing, using, or participating in the Internet. The ISP 102 may be organized in various forms, such as commercial, community-owned, non-profit, or privately owned. Internet services typically provided by ISPs 102 include Internet access, Internet transit, domain name registration, web hosting, Usenet service, and colocation. The ISPs 102 shown in FIG. 1 may represent any suitable ISPs such as hosting ISPs, transit ISPs, virtual ISPs, free ISPs, wireless ISPs, and so forth.

The network service provider (NSP) 104 is an organization that provides bandwidth or network access by providing direct Internet backbone access to Internet service providers. Network service providers may provide access to network access points (NAPs). Network service providers 104 are sometimes referred to as backbone providers or Internet providers. Network service providers 104 may include telecommunication companies, data carriers, wireless communication providers, Internet service providers, and cable television operators offering high-speed Internet access. Network service providers 104 can also include information technology companies.

It should be appreciated that the system 100 illustrated in FIG. 1 is exemplary only and that many different configurations and systems may be created for transmitting data between networks and computing devices. Because there is a great deal of customizability in network formation, there is a desire to create greater customizability in determining the best path for transmitting data between computers or between networks. In light of the foregoing, disclosed herein are systems, methods, and devices for offloading best path computations to an external device to enable greater customizability in determining a best path algorithm that is well suited to a certain grouping of computers or a certain enterprise.

Figure 2:
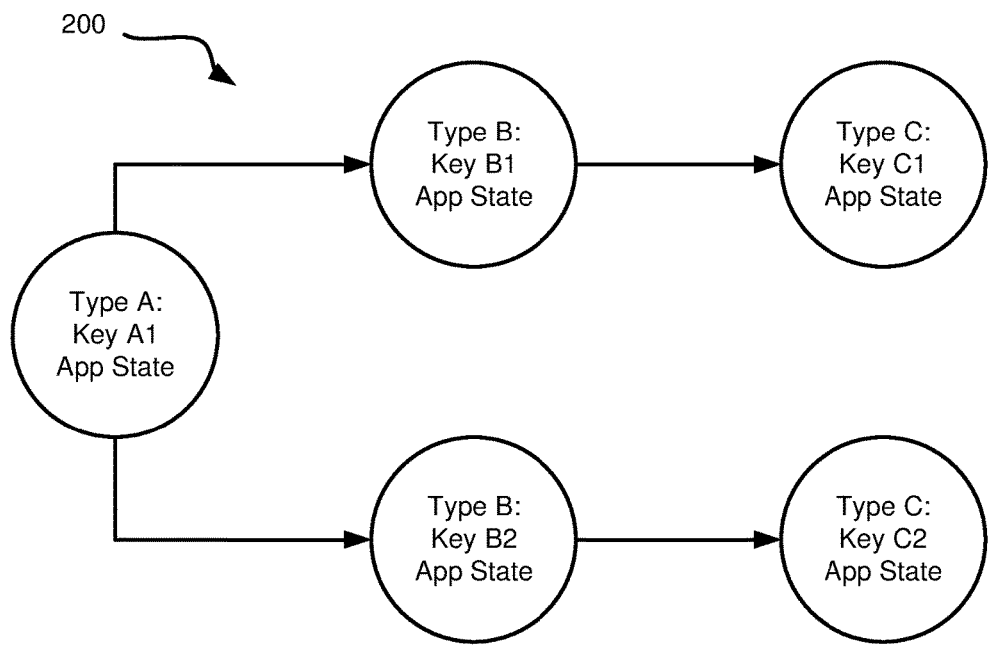
FIG. 2 is a schematic diagram of an object hierarchy with multiple dependencies that can be managed by an asynchronous object manager.

FIG. 2 is a schematic diagram of an object structure 200 including three types of objects A, B, and C in an environment managed by an asynchronous object manager as discussed herein. The object instances of type A, B, and C are identified by keys. The object type A is represented by key A1. The objects type B are represented by the keys B1 and B2. The objects type C are represented by the keys C1 and C2. The arrows represent dependencies between objects. The object type A with key A1 is dependent on both objects type B with keys B1 and B2. The object type B with key B1 depends on the object type C with key C1. The object type B with key B2 depends on the object type C with key C2.

In an example implementation, it is assumed that objects type A and B are produced by one producer and objects type C are produced by another producer. The information in these objects can be programmed in the data plan in order of C, then B, then A. However, because the producers push these objects asynchronously, the objects might arrive out of order.

The asynchronous object manager as discussed herein can be used to solve the ordering requirement illustrated in the above example implementation. In an embodiment, all objects are added to the asynchronous object manager in whichever order the objects are received. The asynchronous object manager detects whether the dependencies of a given object are resolved. In response to determining the dependencies are resolved, the asynchronous object manager calls back an application provided callback and passes the object and its application state for further action.

Figure 3:
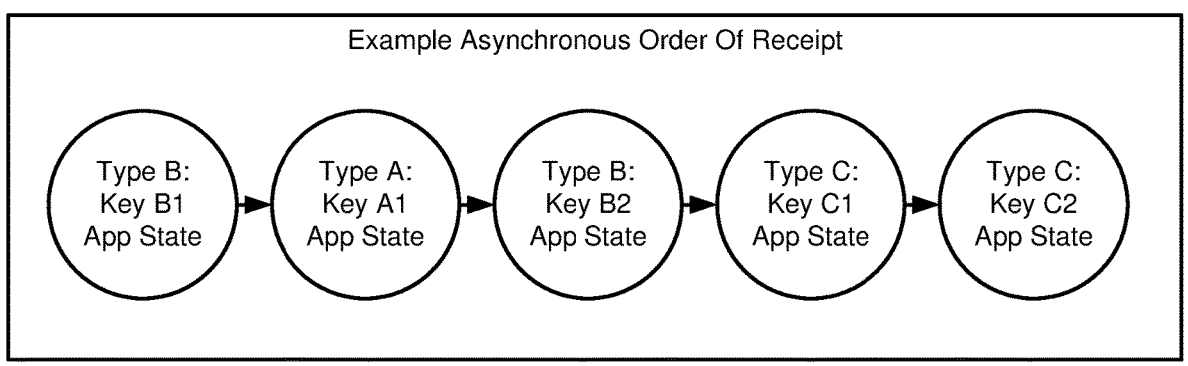
FIG. 3 is a schematic diagram of an example order of asynchronously receiving objects.
Figure 4:
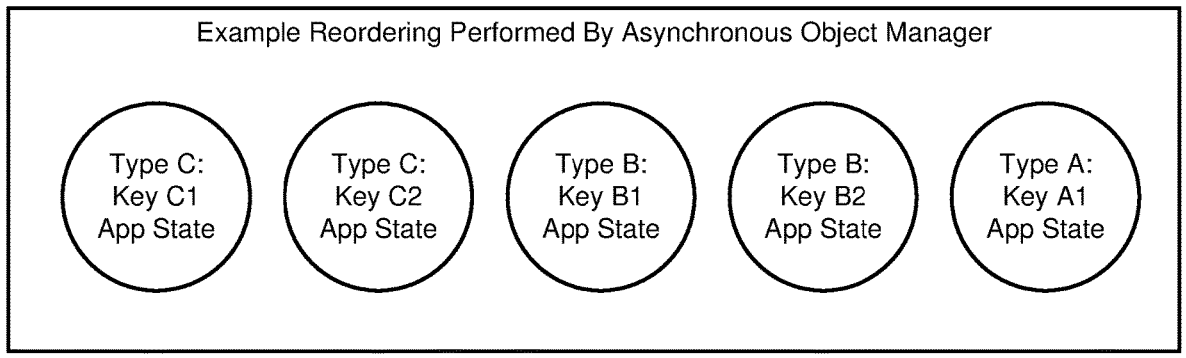
FIG. 4 is a schematic diagram of an example reordering of objects received by an asynchronous object manager.
Figure 5:
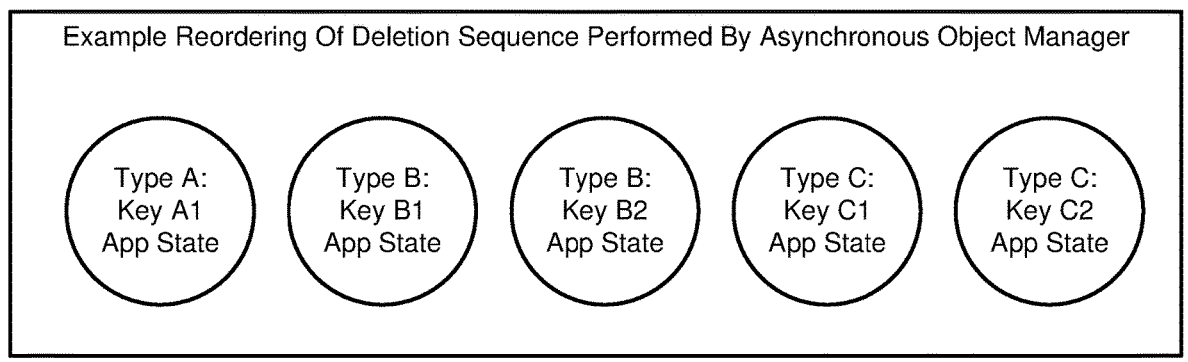
FIG. 5 is a schematic diagram of an example reordering of a deletion sequence.

In the example implementation, the actual arrival sequence of the objects is B(B1), A(A1), B(B2), C(C1), and C(C2). This is illustrated in FIG. 3. The asynchronous object manager reorders this sequence and initiates a callback on the application in a suitable order. The ordering of the objects may differ for different implementations. An example ordering of the objects is: C(C1), C(C2), B(B1), B(B2), A(A1). This is illustrated in FIG. 4. Likewise, a deletion sequence from the producers may look like: C(C1), C(C2), B(B1), B(B2), A(A1). The asynchronous object manager would reorder the deletion sequence to be: A(A1), B(B1), B(B2), C(C1), C(C2). This is illustrated in FIG. 5.

The dependencies may be defined according to a unique key that identifies the object in the system space of the asynchronous object manager. The dependency may indicate the key of the parent object that the child object adopts. For example, a route object may have a field called "nexthopID" and the nexthopID is the key of the NextHop object. When a router object is added to the asynchronous object manager, a separate dependency list includes the nexthopID. This in turn uniquely identifies the NextHop object it depends upon.

Figure 6:
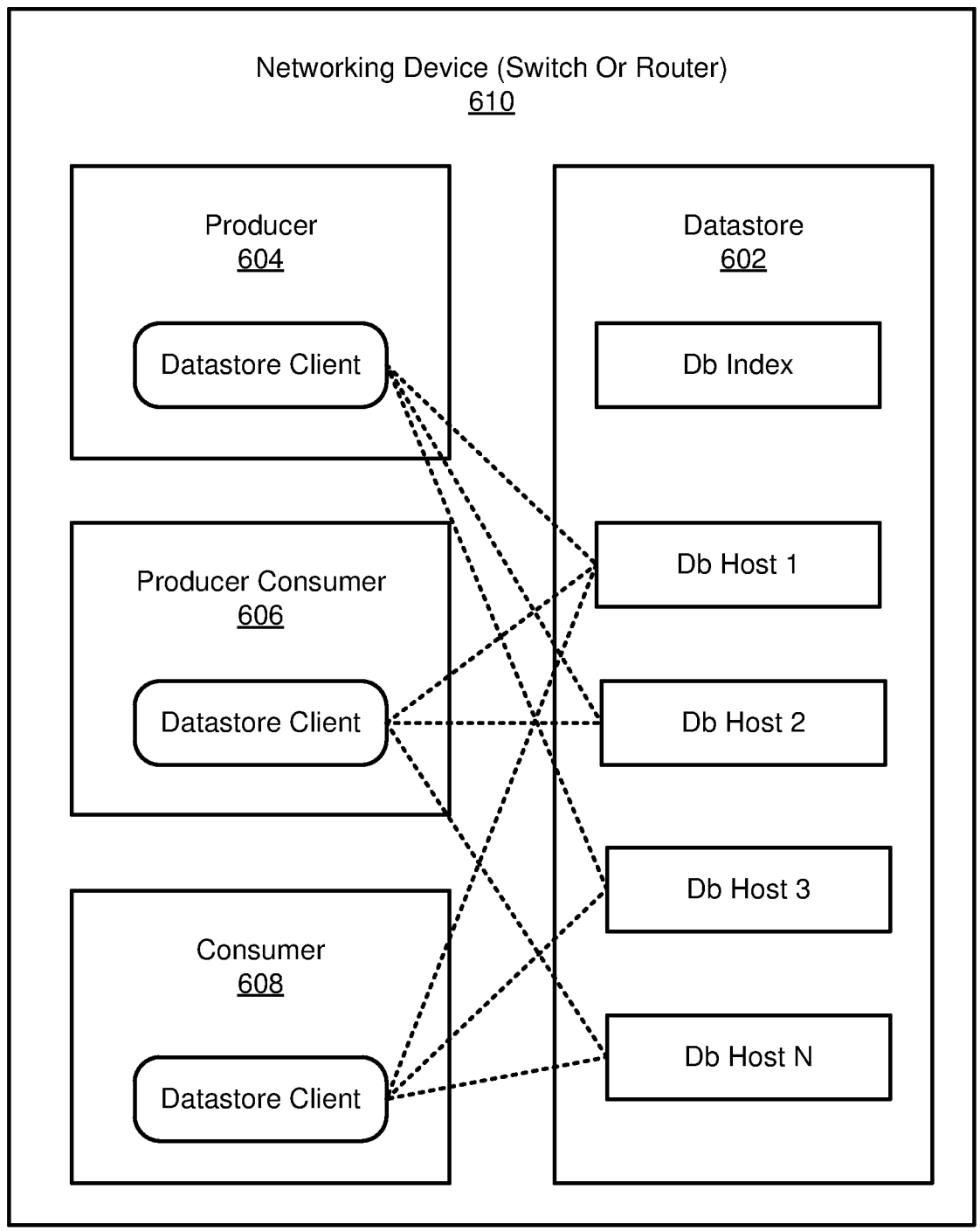
FIG. 6 is a schematic diagram of communications facilitated by a networking device.

FIG. 6 is a schematic diagram of communications facilitated by a BGP instance 610. In an embodiment, there is a datastore 602 local to the BGP instance that stores pertinent information for the system. The datastore 602 may be a database storing best path information for one or more routers or switches. The datastore 602 may further store system state information such as CPU utilization, temperature, fan speed, and state information for peripherals such as LEDs or other devices. The datastore 602 may store a variety of information that may be useful to a monitoring agent. The information in the datastore 602 can be streamed out to another controller or device that could want such information. The datastore 602 may include a database index and may include multiple hosts. Each of the multiple hosts may include a processor and cache memory. In the example embodiment shown in FIG. 6, the datastore 602 includes a database host 1, a database host 2, a database host 3, and so on thru database host n.

The datastore 602 is in communication with a producer 604, a producer consumer 606, and a consumer 608. The producer 604 is a process that produces information is consumed by a consumer 606. The forwarding information base (FIB) (see 710) produces routes and next hops. The next hop produced by the FIB has a dependency on the interface produced by an interface manager.

Figure 7:
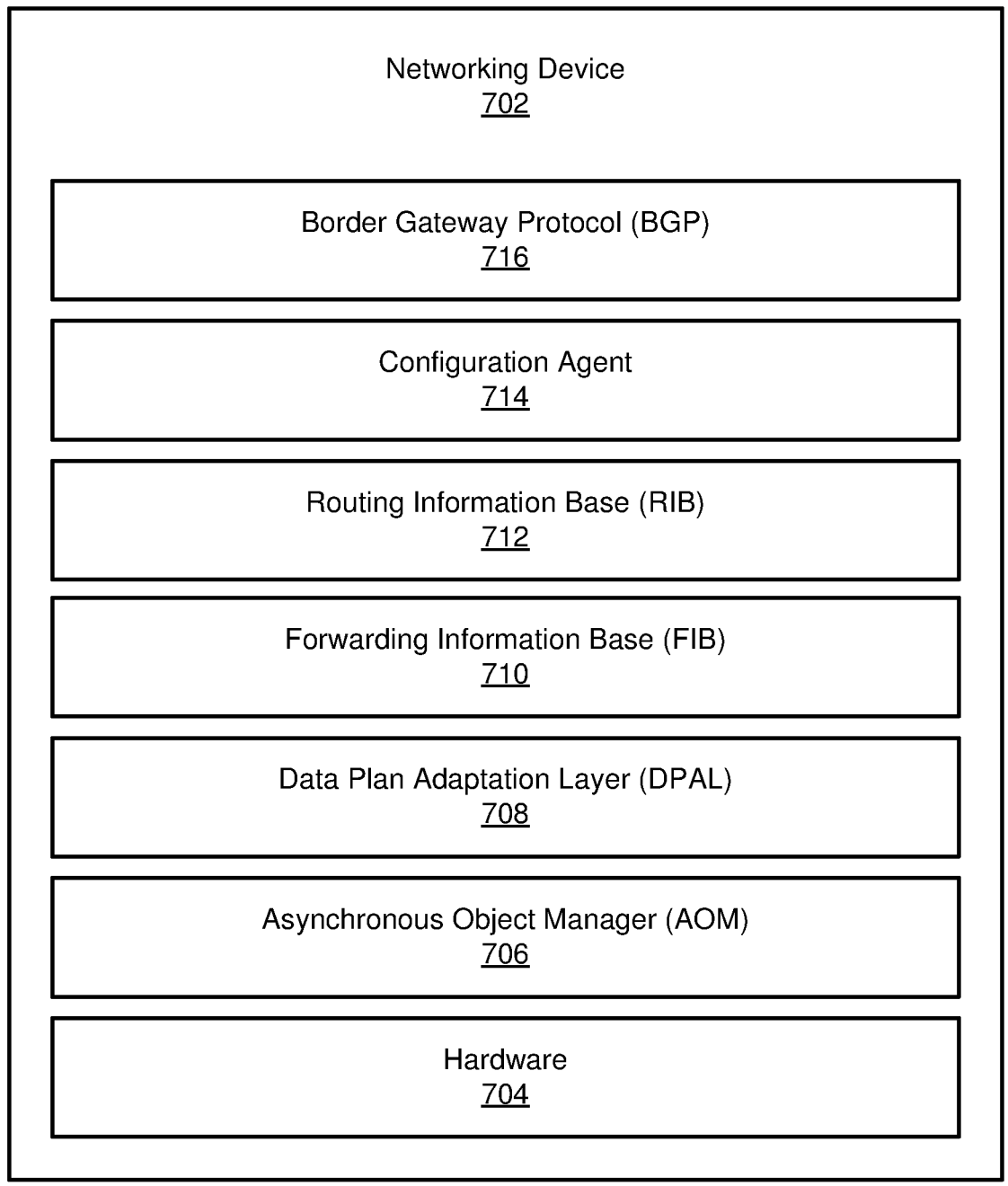
FIG. 7 is a schematic diagram of an example networking device including hardware and a software stack providing instructions for hardware operations.

FIG. 7 is a schematic diagram of a networking device 702. The networking device 702 may be a switch 106 or a router 112. The networking device 702 includes one or more of hardware 704, an asynchronous object manager 706, a data plan adaptation layer (DPAL) 708, a forwarding information base (FIB) 710, a routing information base (RIB) 712, a configuration agent, and a Border Gateway Protocol (BGP) 716. It should be appreciated the networking device 702 may have additional components that are not illustrated herein.

The software portions of the networking device 702 may be included in the software stack 414 shown in FIG. 4. This software stack 414 works in conjunction with hardware to perform operations of networking device 702 such as a switch or router. In an embodiment, the software portions of the networking device 702 are not located locally within the BGP instance but are instead offloaded to cloud storage. The software stack 414 may be offloaded to cloud storage and copied locally on networking device 702 device.

In an embodiment, the asynchronous object manager 706 provides one or more application program interfaces (APIs) to track the life cycle of different control plane information (represented as objects in, for example, FIGS. 2-5). The asynchronous object manager 706 further tracks dependencies between objects. The asynchronous object manager 706 is located in the lowest layer to help sequence and order information asynchronously flowing down from different producers.

In an embodiment, the asynchronous object manager 706 implements a state machine for reordering objects. In an embodiment, if objects from different producers do not arrive in the required order, the state machine holds back the creation or updates of the dependent objects until the parent objects are created. Likewise, the state machine holds back deletion of an object until its dependents have been updated or deleted. The asynchronous object manager 706 organizes the objects using a data structure resembling the graph and can recursively ripple the effect of creating, updating, and/or deleting an object up or down the dependency graph. See FIGS. 2-5.

The asynchronous object manager 706 includes a framework comprising declarative language. The declarative language expresses the dependencies between different kinds of objects. The declarative language can be used to define the schemas for different object types. Further, the declarative language can be used along with attributes that make up the object's key and other attributes to identify the object's dependencies. In an embodiment, after the schemas are defined, a code generator can be run to generate code for the different objects. The generated code covers on or more of programming language constructs to represent the objects, APIs to add or delete an object, auto generation of code to extract keys and dependent keys, or object state observation APIs.

Further in an embodiment, the framework of the asynchronous object manager 706 enables a multiple threaded architecture at the lowest layer by allowing multiple threads to program the data plane. The work distribution can be done in numerous different methods. One method includes causing each thread to manage care of data plane programming for one or more data plane devices (commonly ASIC chips). This method is straightforward because work from producers are evenly distributed across one or more worker threads. Further, each worker thread has an instance of the asynchronous object manager 706 framework to hold information from the producers and to program the assigned devices.

Another method includes causing each thread to perform programming for a selected set of data plane tables on the same device. This method is more involved and requires mapping the worker threads to one or more feature objects. A distributor thread may be responsible for distributing the feature objects to the respective worker thread. Here, relationship between the objects may span across threads. The asynchronous object manager 706 may require extended capabilities to keep track of object dependencies across threads. Synchronization is achieved by message passing between threads. The asynchronous object manager 706 may ensure that an object is deleted only once and there are no objects in the other threads that depend on that object.

The forwarding information base (FIB) 710 may alternatively be referred to as a forwarding table. The FIB is configured to identify the proper output network interface to which an input interface should forward an object. The FIB is a dynamic table that maps media access control (MAC) addresses to ports.

The routing information base (RIB) 712 may alternatively be referred to as a routing table. The RIB is a data table stored in the networking device 702 that lists the routes to particular network destinations, and in some cases, metrics (distances) associated with the routes. The RIB 712 includes information about the topology of the network surrounding the networking device 702. The construction of routing tables is the primary goals of routing protocols such as the Border Gateway Protocol (BGP) 716.

Figure 8:
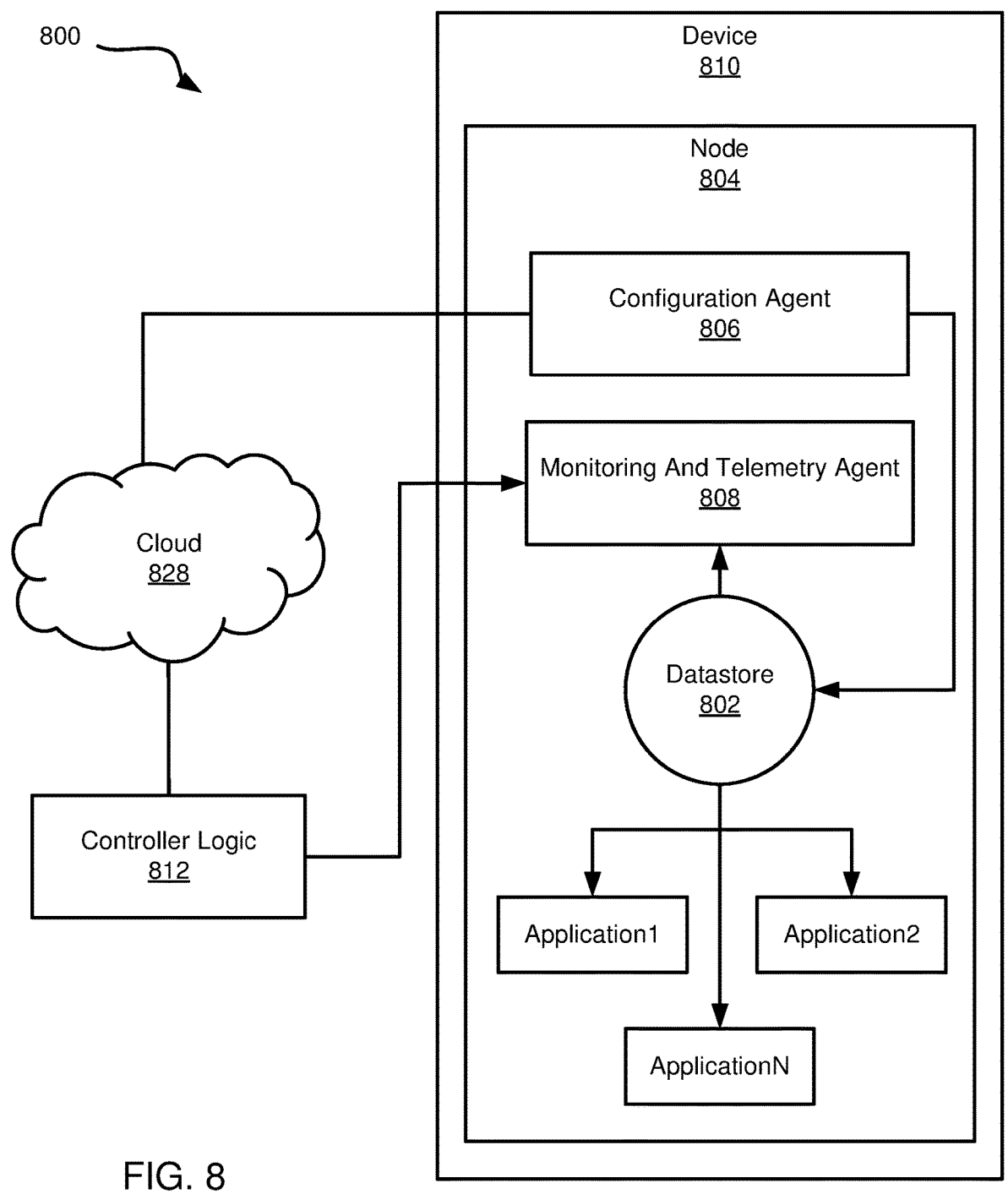
FIG. 8 is a schematic diagram of a system for offloading controller logic for a device to a cloud network.

FIG. 8 is a schematic diagram of system 800 for communication between a node 804 of a device 810 and controller logic 812 stored in a cloud network 828. The controller logic 812 may include logic for operations of the asynchronous object manager. The device 810 may be a switch 106 or a router 162 as discussed herein. The node 804 includes a configuration agent 806 and a monitoring/telemetry agent 808. The device 810 includes a datastore 802. The datastore 802 may be stored locally with the node 804, may be stored in the device 810 and made accessible to multiple nodes, may be offloaded to cloud storage, or may be stored externally and made accessible to multiple devices 802. The configuration agent 806 receives instructions in the form of controller logic 812. The controller logic 812 is stored in cloud-based storage on a cloud network and is made accessible to the device 810 over a network. The configuration agent 806 provides instructions to the monitoring/telemetry agent 808. The monitoring/telemetry agent 808 receives information from the datastore 802. The datastore 802 may include information for multiple applications such as application 1, application 2, and up thru application N as shown.

Figure 9:
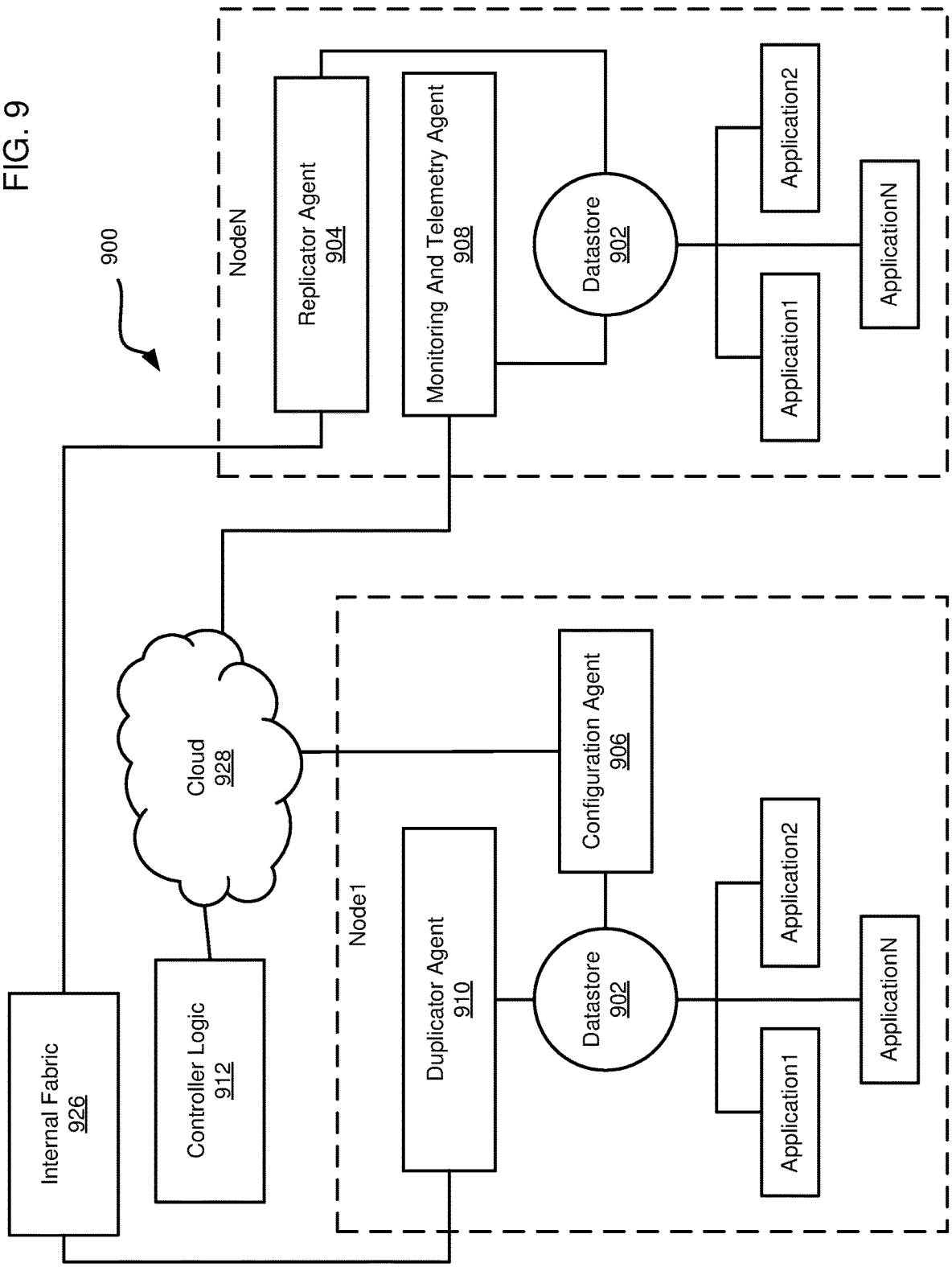
FIG. 9 is a schematic diagram of a system for offloading controller logic for a device to a cloud network.

FIG. 9 is a schematic diagram of an architecture 900 of a multiple node datastore. The example architecture 900 includes two nodes shown as discrete blocks Node1 and NodeN. It should be appreciated there may be any number of nodes suitable to different embodiments and implementations of the disclosure. Node1 includes a duplicator agent 910 in communication with the internal fabric 926 that provides communication with the replicator agent 904 of NodeN. The configuration agent 906 of Node1 is in communication with the cloud 928 network which includes the controller logic 912 for the datastore 902. Each of the nodes includes a copy of the datastore 902. The information in the datastore 902 may be accessed and used by multiple applications such as application1, application2, and up thru applicationN. The monitoring and telemetry agent 908 of NodeN is in communication with the datastore 902 and the cloud 928 network. The configuration agent 906 of Node1 can be in communication with the monitoring and telemetry agent 908 of NodeN by way of the cloud 928 network.

Figure 10:
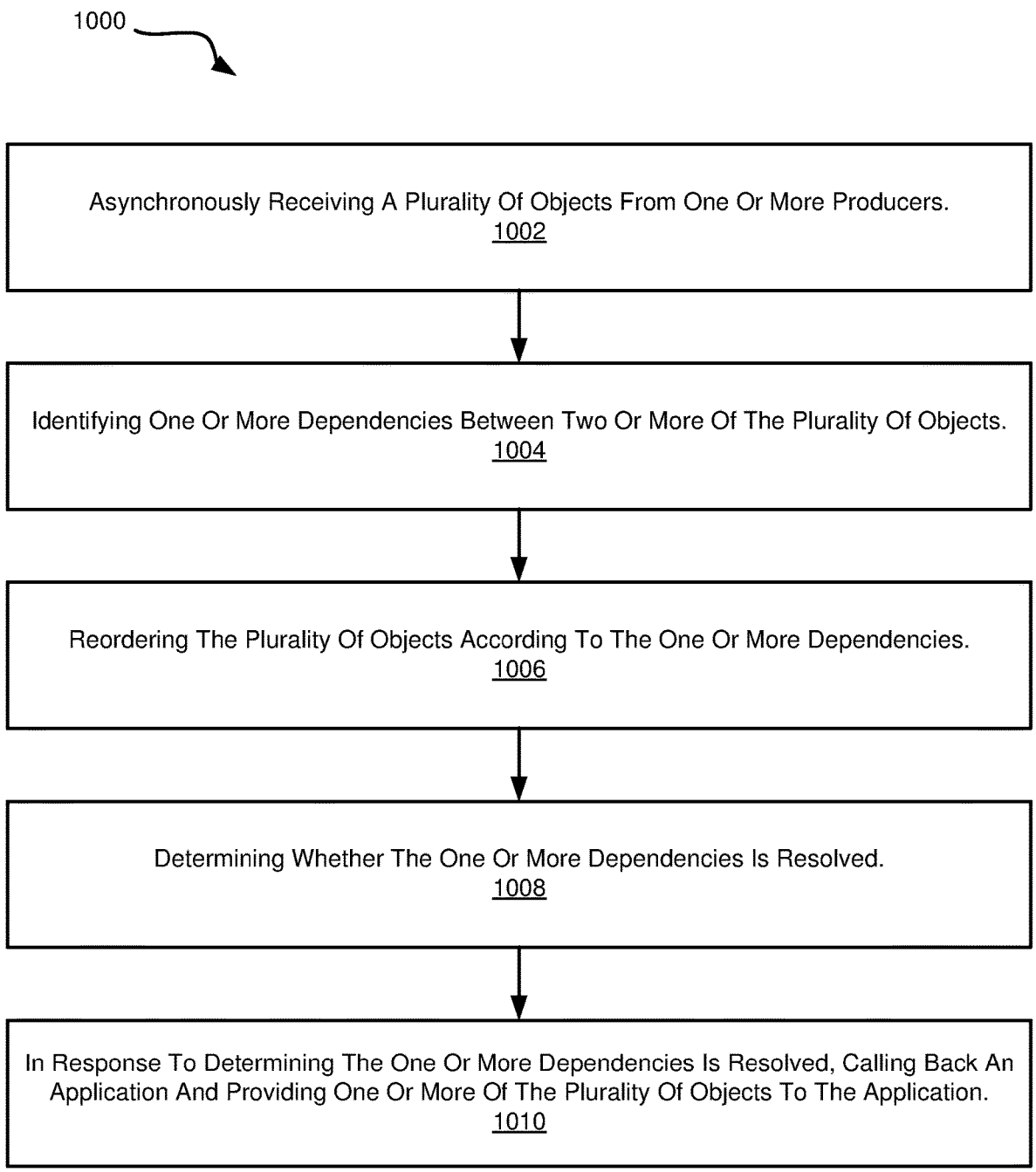
FIG. 10 is a schematic flow chart diagram of a method for receiving and reordering objects to be transmitted over a computer network.

FIG. 10 is a schematic block diagram of a method 1000 for asynchronously receiving and reordering data to be transmitted with a networking device. The method 1000 can be performed by an asynchronous object manager 706 as discussed herein or any suitable computing device.

The method 1000 begins and a computing device asynchronously receives at 1002 a plurality of objects from one or more producers. The objects may include, for example, routes, next hops, equal-cost multipath groups, interfaces, ACL, ACEs, QoS classes, sub-interfaces, virtual local area networks, and so forth. The method 1000 continues and a computing device identifies at 1004 one or more dependencies between two or more of the plurality of objects. The method 1000 continues and a computing device reorders at 1006 the plurality of objects according to the one or more dependencies. The method 1000 continues and a computing device determines at 1008 whether the one or more dependencies is resolved. The method 1000 includes, in response to determining the one or more dependencies is resolved, calling back at 1010 an application and providing one or more of the plurality of objects to the application.

Figure 11:
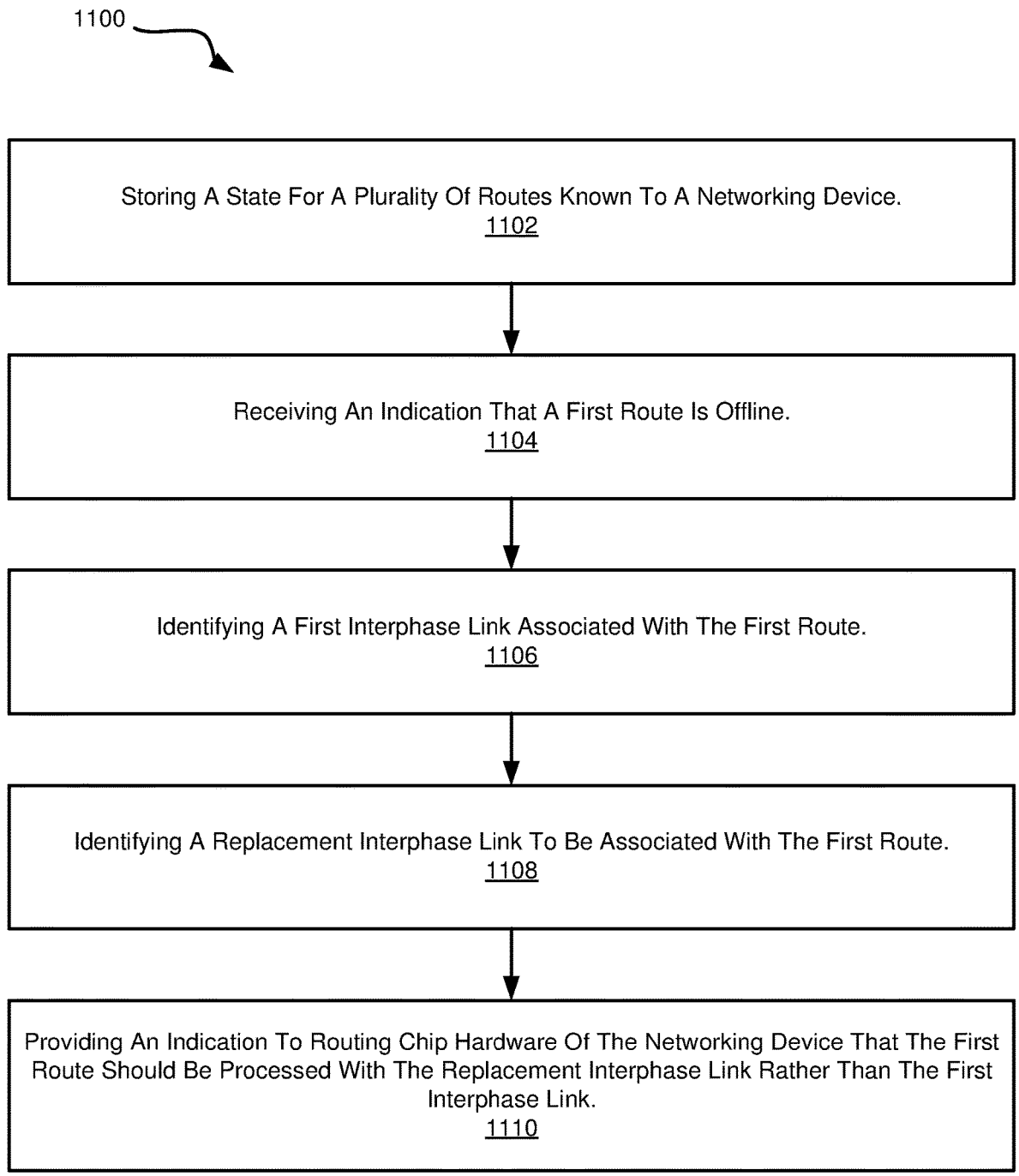
FIG. 11 is a schematic flow chart diagram of a method for improving operations of a networking device in a network computing environment.

FIG. 11 is a schematic block diagram of a method 1100 for improving operations of a networking device. The method 1000 can be performed by an asynchronous object manager 706 as discussed herein or any suitable computing device.

The method 1100 begins and a computing devices stores at 1102 a state for a plurality of routes known to a networking device. The method 1100 includes receiving at 1104 an indication that a first route is offline. The method 1100 continues and a computing device identifies at 1106 a first interphase link associated with the first route. The method 1100 continues and a computing device identifies at 1108 a replacement interphase link to be associated with the first route. This identification may be performed by performing the Border Gateway Protocol (BGP) algorithm for determining a best path between two locations. The method 1100 continues and a computing device provides at 1110 an indication to routing chip hardware of the networking device that the first route should be processed with the replacement interphase link rather than the first interphase link.

Figure 12:
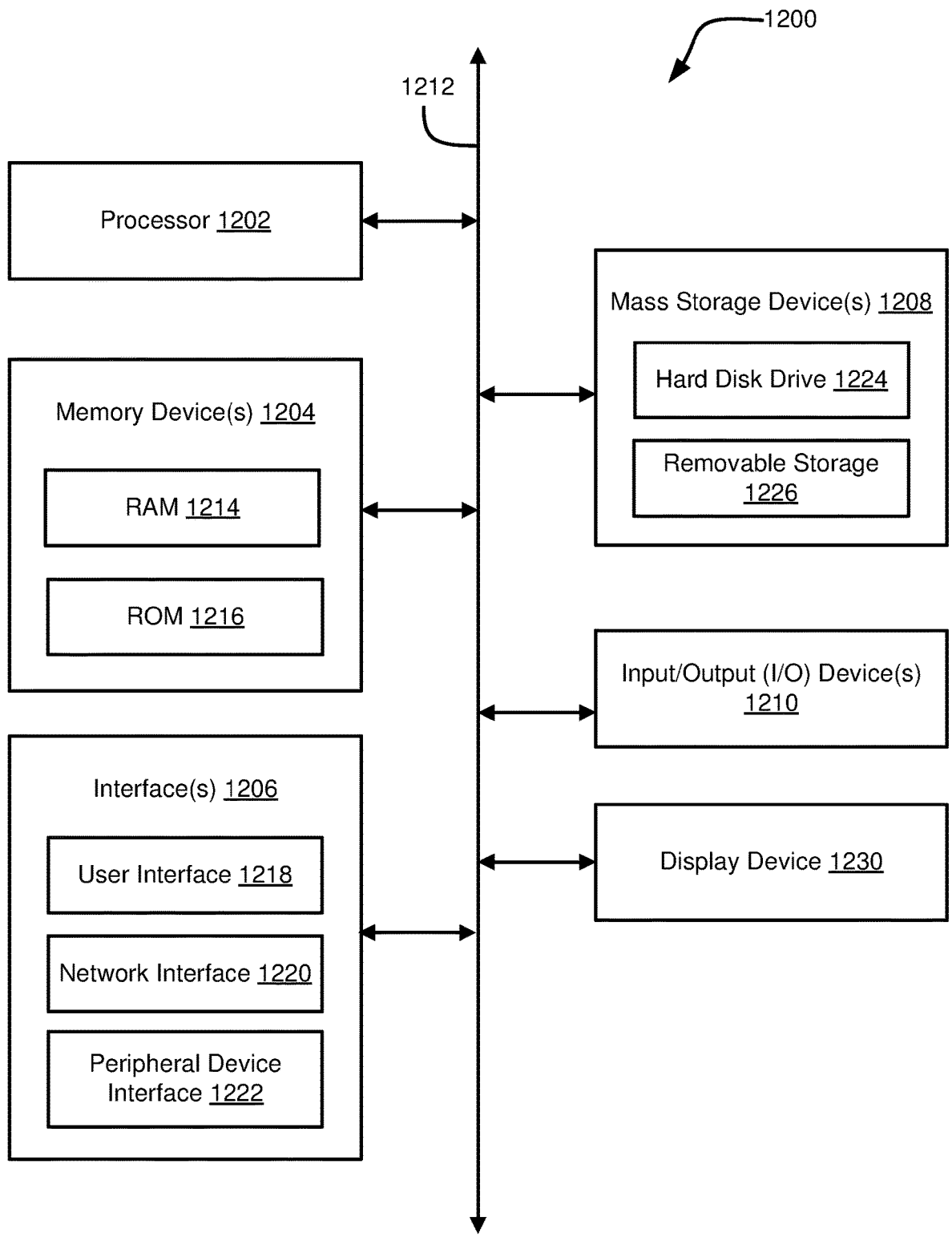
FIG. 12 is a schematic diagram illustrating components of an example computing device.

Referring now to FIG. 12, a block diagram of an example computing device 1200 is illustrated. Computing device 1200 may be used to perform various procedures, such as those discussed herein. In one embodiment, the computing device 1200 can function to perform the functions of the asynchronous object manager and can execute one or more application programs. Computing device 1200 can be any of a wide variety of computing devices, such as a desktop computer, in-dash computer, vehicle control system, a notebook computer, a server computer, a handheld computer, tablet computer and the like.

Computing device 1200 includes one or more processor(s) 1202, one or more memory device(s) 1204, one or more interface(s) 1206, one or more mass storage device(s) 1208, one or more Input/output (I/O) device(s) 1202, and a display device 1230 all of which are coupled to a bus 1212. Processor(s) 1202 include one or more processors or controllers that execute instructions stored in memory device(s) 1204 and/or mass storage device(s) 1208. Processor(s) 1202 may also include various types of computer-readable media, such as cache memory.

Memory device(s) 1204 include various computer-readable media, such as volatile memory (e.g., random access memory (RAM) 1214) and/or nonvolatile memory (e.g., read-only memory (ROM) 1216). Memory device(s) 1204 may also include rewritable ROM, such as Flash memory.

Mass storage device(s) 1208 include various computer readable media, such as magnetic tapes, magnetic disks, optical disks, solid-state memory (e.g., Flash memory), and so forth. As shown in FIG. 12, a particular mass storage device is a hard disk drive 1224. Various drives may also be included in mass storage device(s) 1208 to enable reading from and/or writing to the various computer readable media. Mass storage device(s) 1208 include removable media 1226 and/or non-removable media.

Input/output (I/O) device(s) 1202 include various devices that allow data and/or other information to be input to or retrieved from computing device 1200. Example I/O device(s) 1202 include cursor control devices, keyboards, keypads, microphones, monitors or other display devices, speakers, printers, network interface cards, modems, and the like.

Display device 1230 includes any type of device capable of displaying information to one or more users of computing device 1200. Examples of display device 1230 include a monitor, display terminal, video projection device, and the like.

Interface(s) 1206 include various interfaces that allow computing device 1200 to interact with other systems, devices, or computing environments. Example interface(s) 1206 may include any number of different network interfaces 1220, such as interfaces to local area networks (LANs), wide area networks (WANs), wireless networks, and the Internet. Other interface(s) include user interface 1218 and peripheral device interface 1222. The interface(s) 1206 may also include one or more user interface elements 1218. The interface(s) 1206 may also include one or more peripheral interfaces such as interfaces for printers, pointing devices (mice, track pad, or any suitable user interface now known to those of ordinary skill in the field, or later discovered), keyboards, and the like.

Bus 1212 allows processor(s) 1202, memory device(s) 1204, interface(s) 1206, mass storage device(s) 1208, and I/O device(s) 1202 to communicate with one another, as well as other devices or components coupled to bus 1212. Bus 1212 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1200 and are executed by processor(s) 1202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, if any, any future claims submitted here and in different applications, and their equivalents.

EXAMPLES

The following examples pertain to further embodiments.

Example 1 is a system. The system includes routing chip hardware and an asynchronous object manager in communication with the routing chip hardware. The asynchronous object manager is configurable to execute instructions stored in non-transitory computer readable storage media. The instructions include asynchronously receiving a plurality of objects from one or more producers. The instructions include identifying one or more dependencies between two or more of the plurality of objects. The instructions include reordering the plurality of objects according to the one or more dependencies. The instructions include determining whether the one or more dependencies is resolve. The instructions include, in response to determining the one or more dependencies is resolved, calling back an application and providing one or more of the plurality of objects to the application.

Example 2 is a system as in Example 1, wherein the asynchronous object matter comprises a state machine.

Example 3 is a system as in any of Examples 1-2, wherein the asynchronous object matter is the bottom most layer of a software stack for managing operations of a networking device.

Example 4 is a system as in any of Examples 1-3, wherein the one or more producers comprise one or more of an application, a process, a thread, or a function.

Example 5 is a system as in any of Examples 1-4, wherein the instructions further comprise providing a message to the routing chip hardware indicating that a first route needs to be processed through a first interphase link.

Example 6 is a system as in any of Examples 1-5, further comprising a Data Plan Adaptation Layer (DPAL) in communication with the asynchronous object manager and the routing chip hardware, and wherein the instructions for the asynchronous object manager further comprise: receiving a message from the DPAL to create a route for a message to be transmitted from a first location to a final destination; creating the route for the message; and providing the route to the DPAL.

Example 7 is a system as in any of Examples 1-6, wherein the instructions further comprise: storing a state for a plurality of routes known to the asynchronous object manager; receiving an indication that a first route is offline; identifying a first interphase link associated with the first route; identifying a replacement interphase link to be associated with the first route; and providing an indication to the routing chip hardware that the first route should be processed with the replacement interphase link rather than the first interphase link.

Example 8 is a system as in any of Examples 1-7, wherein the asynchronous object manager provides a means for a first producer to provide a message to the asynchronous object manager in lieu of providing a message directly to a second producer of a next hop.

Example 9 is a system as in any of Examples 1-8, wherein the asynchronous object manager is compatible for operating on a switch or a router.

Example 10 is a system as in any of Examples 1-9, wherein the instructions further comprise: receiving a deletion sequence for the plurality of objects from the one or more producers; and reordering the deletion sequence according to the one or more dependencies.

Example 11 is one or more processors configurable to execute instructions stored in non-transitory computer readable storage media. The instructions include asynchronously receiving a plurality of objects from one or more producers. The instructions include identifying one or more dependencies between two or more of the plurality of objects. The instructions include reordering the plurality of objects according to the one or more dependencies. The instructions include determining whether the one or more dependencies is resolved. The instructions include, in response to determining the one or more dependencies is resolved, calling back an application and providing one or more of the plurality of objects to the application.

Example 12 is one or more processors as in Example 11, wherein the instructions further comprise providing a message to the routing chip hardware indicating that a first route needs to be processed through a first interphase link.

Example 13 is one or more processors as in any of Examples 11-12, wherein the instructions further comprise: storing a state for a plurality of routes known to the asynchronous object manager; receiving an indication that a first route is offline; identifying a first interphase link associated with the first route; identifying a replacement interphase link to be associated with the first route; and providing an indication to the routing chip hardware that the first route should be processed with the replacement interphase link rather than the first interphase link.

Example 14 is one or more processors as in any of Examples 11-13, wherein the instructions further comprise providing a means for a first producer to provide a message to the asynchronous object manager in lieu of providing a message directly to a second producer of a next hop.

Example 15 is one or more processors as in any of Examples 11-14, wherein the instructions for the one or more processors are compatible for operating on a switch or a router.

Example 16 is a method. The method includes asynchronously receiving a plurality of objects from one or more producers. The method includes identifying one or more dependencies between two or more of the plurality of objects. The method includes reordering the plurality of objects according to the one or more dependencies. The method includes determining whether the one or more dependencies is resolved. The method includes, in response to determining the one or more dependencies is resolved, calling back an application and providing one or more of the plurality of objects to the application.

Example 17 is a method as in Example 16, further comprising providing a message to the routing chip hardware indicating that a first route needs to be processed through a first interphase link.

Example 18 is a method as in any of Examples 16-17, wherein the asynchronous object matter comprises a state machine and is located at the bottom most layer of a software stack for managing operations of a networking device.

Example 19 is a method as in any of Examples 16-18, further comprising: storing a state for a plurality of routes known to the asynchronous object manager; receiving an indication that a first route is offline; identifying a first interphase link associated with the first route; identifying a replacement interphase link to be associated with the first route; and providing an indication to the routing chip hardware that the first route should be processed with the replacement interphase link rather than the first interphase link.

Example 20 is a method as in any of Examples 16-19, further comprising: receiving a deletion sequence for the plurality of objects from the one or more producers; and reordering the deletion sequence according to the one or more dependencies.

It is to be understood that any features of the above-described arrangements, examples, and embodiments may be combined in a single embodiment comprising a combination of features taken from any of the disclosed arrangements, examples, and embodiments.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
   identifying a dependency between two or more objects of a plurality of objects, wherein the dependency identifies a parent object and a dependent object;
   determining whether the dependency is resolved; and
   in response to determining the dependency is not resolved, postponing one or more of:
      an update on the dependent object until creation of the parent object; or
      deletion of the parent object until deletion of the dependent object.

2. The method of claim 1, wherein identifying the dependency comprises identifying a unique key associated with the parent object that is adopted by the dependent object.

3. The method of claim 1, further comprising reordering at least a portion of the plurality of objects based on the unique key such that the dependent object depends upon the parent object.

4. The method of claim 1, further comprising asynchronously receiving the plurality of objects by way of an application program interface (API) integrated with an asynchronous object manager;
   wherein the asynchronous object manager is a layer of a software stack configured to manage operations of a networking device comprising a switch or a router.

5. The method of claim 4, wherein the asynchronous object manager is a state machine.

6. The method of claim 4, wherein the asynchronous object manager provides a means for a first producer to provide a message to the asynchronous object manager in lieu of providing a message directly to a second producer of a next hop.

7. The method of claim 4, wherein the networking device further comprises a routing information base, wherein the routing information base is a data table stored on the networking device that comprises a listing of routes to networking destinations.

8. The method of claim 4, wherein the asynchronous object manager comprises a multiple threaded architecture.

9. The method of claim 8, wherein the asynchronous object manager manages work distribution by causing each thread within the multiple threaded architecture to manage care of data plane programming for one or more data plane services.

10. The method of claim 8, wherein each thread within the multiple threaded architecture comprises an instance of the asynchronous object manager to store information from producers and to program assigned devices.

11. The method of claim 4, wherein the networking device comprises:
   hardware;
   the asynchronous object manager installed as a bottom-most layer of the software stack for managing the hardware;
   a data plan adaptation layer (DPAL);
   a forwarding information base;
   a routing information base; and
   a configuration agent.

12. The method of claim 4, wherein the networking device further comprises a forwarding information base configured to identify proper output network interface to which an input interface should forward an object, and wherein the forwarding information base is a dynamic table that maps media access control addresses to ports.

13. The method of claim 4, wherein identifying the dependency comprises identifying a unique key associated with the parent object that is adopted by the dependent object;
   wherein the unique key is associated with a next hop object; and
   wherein a router object added to the asynchronous object manager.

14. The method of claim 1, further comprising, in response to determining the dependency is resolved, calling back an application and providing the two or more of the plurality of objects to the application.

15. The method of claim 1, further comprising receiving the plurality of objects from one or more producers, and wherein the one or more produces comprises one or more of an application, a process, a thread, or a function.

16. The method of claim 1, further comprising, in response to determining the dependency is resolved, providing the two or more of the plurality of objects to a data plane adaptation layer (DPAL) of a networking device, wherein the networking device is a switch or a router.

17. The method of claim 16, further comprising providing the DPAL a route for transferring messages from a first location to a final destination.

18. The method of claim 16, further comprising receiving a query from the DPAL, wherein the query requests a route for transmitting a message from a first location to a final destination.

19. The method of claim 18, further comprising:
calculating the route requested by the DPAL;
recording the route; and
providing the route to the DPAL;
wherein providing the route comprises providing only in response to determining the dependency is resolved.

20. The method of claim 1, further comprising:
receiving a deletion sequence for the plurality of objects from one or more producers; and
reordering the deletion sequence based on the dependency.

* * * * *